US008549699B1

(12) United States Patent
Domingo

(10) Patent No.: US 8,549,699 B1
(45) Date of Patent: Oct. 8, 2013

(54) ILLUMINATED LEAF BLOWER

(76) Inventor: Francisco A. Domingo, Homestead, FL (US)

(*) Notice: Subject to any disclaimer, the term of this patent is extended or adjusted under 35 U.S.C. 154(b) by 35 days.

(21) Appl. No.: 13/428,078

(22) Filed: Mar. 23, 2012

(51) Int. Cl.
*A47L 5/24* (2006.01)
*E01H 1/08* (2006.01)

(52) U.S. Cl.
USPC .................................. 15/324; 15/410; 15/405

(58) Field of Classification Search
USPC ............. 15/324, 410, 246, 246.2, 312.2, 344; 362/109, 253
See application file for complete search history.

(56) References Cited

U.S. PATENT DOCUMENTS

| 2,274,971 | A |   | 3/1942  | White |             |
|-----------|---|---|---------|-------|-------------|
| D279,319  | S |   | 6/1985  | McCloskey et al. | |
| 4,754,379 | A | * | 6/1988  | Kelley .......................... 362/202 |
| 4,829,625 | A | * | 5/1989  | Wang ............................ 15/422.2 |
| 5,048,615 | A |   | 9/1991  | Feldman |         |
| 5,563,774 | A |   | 10/1996 | Welsch |          |
| 6,105,206 | A | * | 8/2000  | Tokumaru et al. ............... 15/344 |
| 6,779,227 | B2| * | 8/2004  | Lee .................................. 15/324 |
| 7,677,344 | B2|   | 3/2010  | Medina et al. |   |
| 2008/0301903 | A1 | * | 12/2008 | Cunningham et al. .......... 15/410 |
| 2010/0147331 | A1 |   | 6/2010  | Coppola et al. |   |
| 2011/0000048 | A1 | * | 1/2011  | Yamazaki et al. ............... 15/405 |

\* cited by examiner

Primary Examiner — Mark Spisich
Assistant Examiner — Andrew A Horton
(74) Attorney, Agent, or Firm — McHale & Slavin, P.A.

(57) ABSTRACT

An illuminated leaf blower having a light disposed upon a handle, the handle disposed upon a pipe section of a blower tube at an angle deviant from the perpendicular by means of a pivotally securable attachment member, the attachment member disposed upon a lockable collar, said lockable collar securably moveable along the pipe section to position the handle as desired for a particular person wielding the device, the handle having a switch disposed on a rearward haunch of a head piece, said head piece disposed atop the handle configured to be ergonomically accessed by means of a thumb of the person wielding the device, whereby the light selectively illuminates an area over which an airflow from the illuminated leaf blower is directed.

12 Claims, 4 Drawing Sheets

ILLUMINATED LEAF BLOWER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Figure 1:
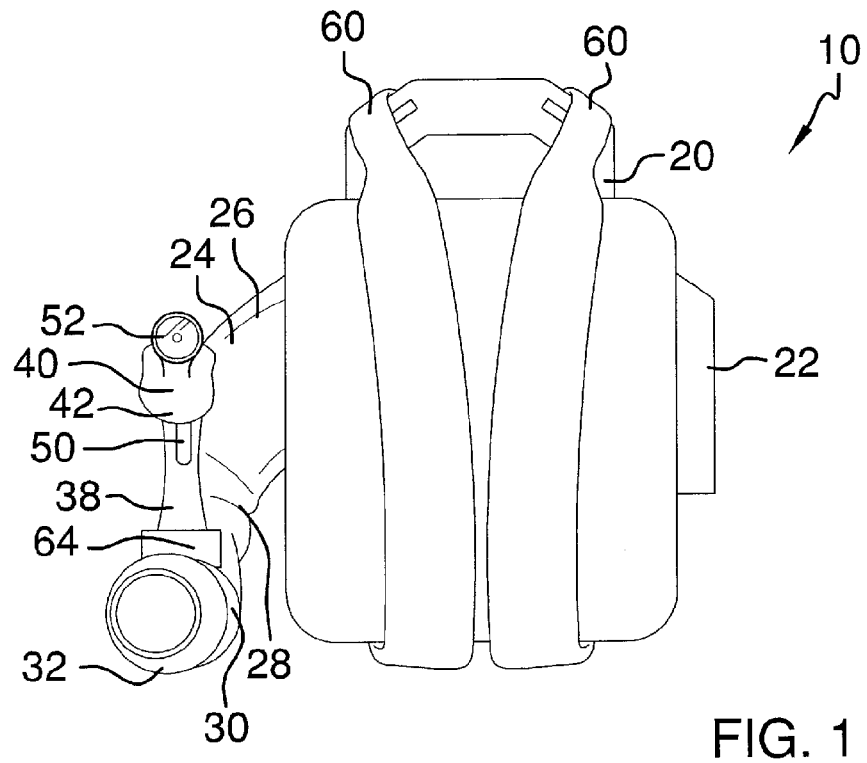

Various types of illuminated leaf blowers are known in the prior art. However, what is needed is an illuminated leaf blower having a light disposed upon a handle, the handle disposed upon a pipe section of a blower tube at an angle deviant from the perpendicular by means of a pivotally securable attachment member, the attachment member disposed upon a lockable collar, said lockable collar securably moveable along the pipe section to position the handle as desired for a particular person wielding the device, the handle having a switch disposed on a rearward haunch of a head piece, said head piece configured to be ergonomically accessed by means of a thumb of the person wielding the device, whereby the light selectively illuminates an area over which an airflow from the illuminated leaf blower is directed.

FIELD OF THE INVENTION

The present invention relates to an illuminated leaf blower, and more particularly, to an illuminated leaf blower having a light disposed upon a handle, the handle disposed upon a pipe section of a blower tube at an angle deviant from the perpendicular by means of a pivotally securable attachment member, the attachment member disposed upon a lockable collar, said lockable collar securably moveable along the pipe section to position the handle as desired for a particular person wielding the device, the handle having a switch disposed on a rearward haunch of a head piece, said head piece configured to be ergonomically accessed by means of a thumb of the person wielding the device, whereby the light selectively illuminates an area over which an airflow from the illuminated leaf blower is directed.

SUMMARY OF THE INVENTION

The general purpose of the illuminated leaf blower, described subsequently in greater detail, is to provide an illuminated leaf blower which has many novel features that result in an illuminated leaf blower which is not anticipated, rendered obvious, suggested, or even implied by prior art, either alone or in combination thereof.

Yard work and grounds keeping is often performed early in the morning or in the evening. Sometimes this is due to a person's work schedule—they seek to accomplish some yard work before or after their regular workday. More often, however, it is due to yard crews working long hours, to coordinate with a homeowner previous to her leaving for the day, or work under the supervision of the homeowner while she is at home. Grounds crews, on the other hand, need to get their jobs done often before the grounds are open to the public, which is nearly always early in the morning. In the southern regions of the United States, early morning or evening yard work is also beneficial to avoid the hottest times of the day, and one is generally more productive during these times. As a professional grounds worker who has operated a leaf blower on a daily basis for thirteen years, I am familiar with this schedule—in fact my crew and I start work around 4:30 a.m. every morning on a golf course. This means we are active before the sun comes up, almost every day of the year.

As a grounds worker who works early in the morning, I have used many leaf blowers in low-light conditions. In order to effectively blow leaves into a determined location, an artificial light source is then needed, and, not finding an illuminated leaf blower available on the market or evinced in the prior art, I have had to resort to using a flashlight or a head lamp. It is cumbersome to use a flashlight—one hand is used in directing the leaf blower, and the flashlight must be directed in the other hand. This is awkward and inefficient and often requires the flashlight be set down to administer a task with the hand not directing the leaf blower. Headlamps are uncomfortable and, with extended use (such as daily use for a few hours or more), are prone to dead batteries. Many times I have thought to myself, an illuminated leaf blower with a light would be useful; a ready improvement over the prior art.

The present illuminated leaf blower, therefore, includes a motor mounted in a frame, the frame configured to be worn on the back of a person using the leaf blower. A blower tube is connected to the motor, the blower tube including a connector portion directly connected to the motor, an articulated section flexibly disposed from the connector portion, a pipe section disposed from the articulated section, and a nozzle portion disposed endwise on the pipe section. The pipe section and nozzle portion are moveable and directable by means of the articulated section flexibly disposed from the connector portion.

A lockable collar is disposed on the pipe section of the blower tube. The lockable collar is a hoop-shaped member that girds the pipe section and is slidingly moveable along the pipe section. The lockable collar is securable at a desired position along the pipe section. A handle is disposed upon the lockable collar, the handle connected to the lockable collar by means of a pivotally securable attachment member. The attachment member enables the handle to move within a sagittal plane with respect to the handle. The attachment member is securable at a desired angle relative the pipe section. Thusly the handle is selectively positional for a particular person using the illuminated leaf blower.

A head piece is disposed atop the handle, the head piece including an overhanging portion, an irregular Quonset-shaped portion, a top surface, and a rearward haunch. A trigger throttle is disposed depending from the overhanging portion, the trigger throttle ergonomically configured to be manipulated by a forefinger of a person wielding the device. The trigger throttle enables a user to control the rate of airflow forcibly directed by the device through the blower tube.

A light is disposed atop the top surface of the head piece, the light configured to shine towards the nozzle portion of the blower tube. A switch, in operational communication with the light, is disposed on the rearward haunch of the head piece, the switch ergonomically accessible by means of a thumb of a person wielding the device. The light may be alternately activated and deactivated by means of the switch. The light, therefore, being disposed upon the handle, and aimed generally in the direction of the nozzle portion of the blower tube, illuminates the area over which the airflow is forcibly directed by the device. Thusly, the person wielding the device may use his other hand, as desired, to administer another task, as is often necessary when blowing leaves.

A battery is included to power the light. The battery is disposed in the frame and therefore carried along with the device. The battery ensures a longer operating life than a headlamp or other handheld light source, and may be recharged at night when the illuminated leaf blower is not in use. The light is therefore readily powered and functional, without the repeated need to change the battery or power source, as is typical of a headlamp or handheld flashlight.

Thus has been broadly outlined the more important features of the present illuminated leaf blower so that the detailed description thereof that follows may be better understood and in order that the present contribution to the art may be better appreciated.

Objects of the present illuminated leaf blower, along with various novel features that characterize the invention are particularly pointed out in the claims forming a part of this disclosure. For better understanding of the illuminated leaf blower, its operating advantages and specific objects attained by its uses, refer to the accompanying drawings and description.

BRIEF DESCRIPTION OF THE DRAWINGS FIGURES

Figure 2:
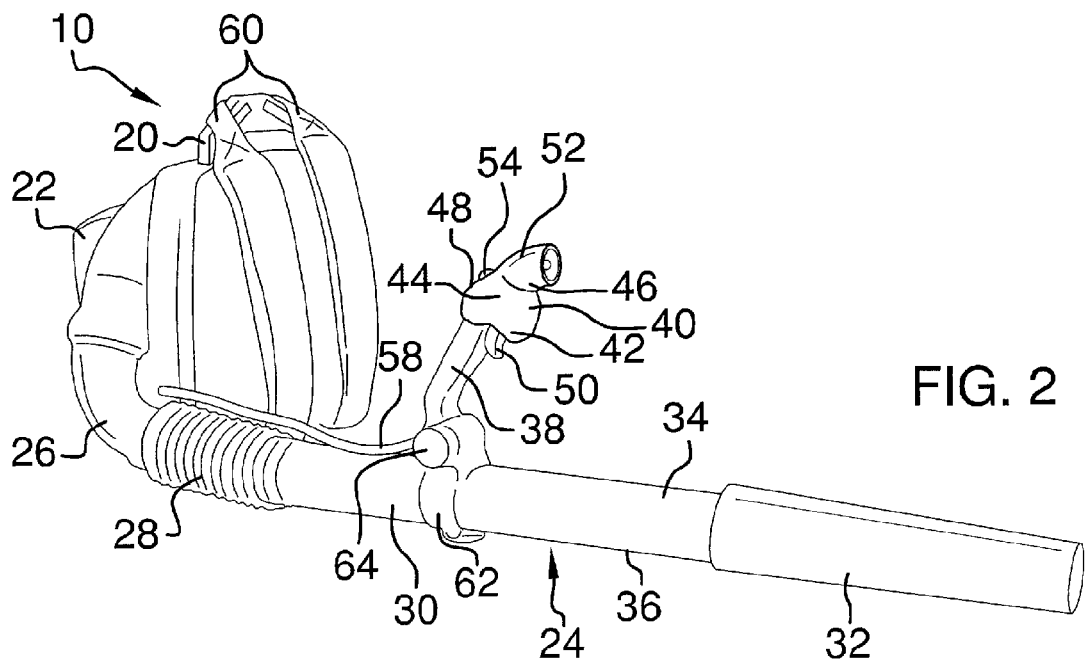
Figure 3:
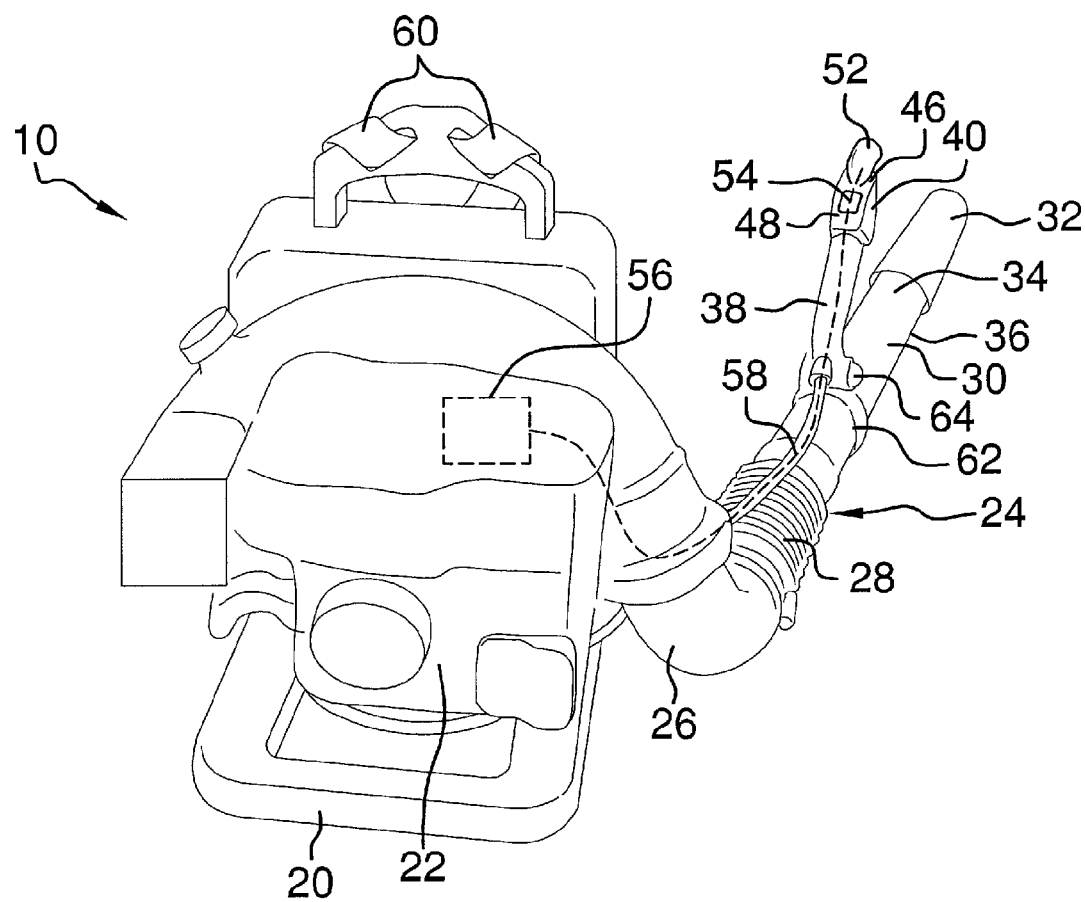
Figure 4:
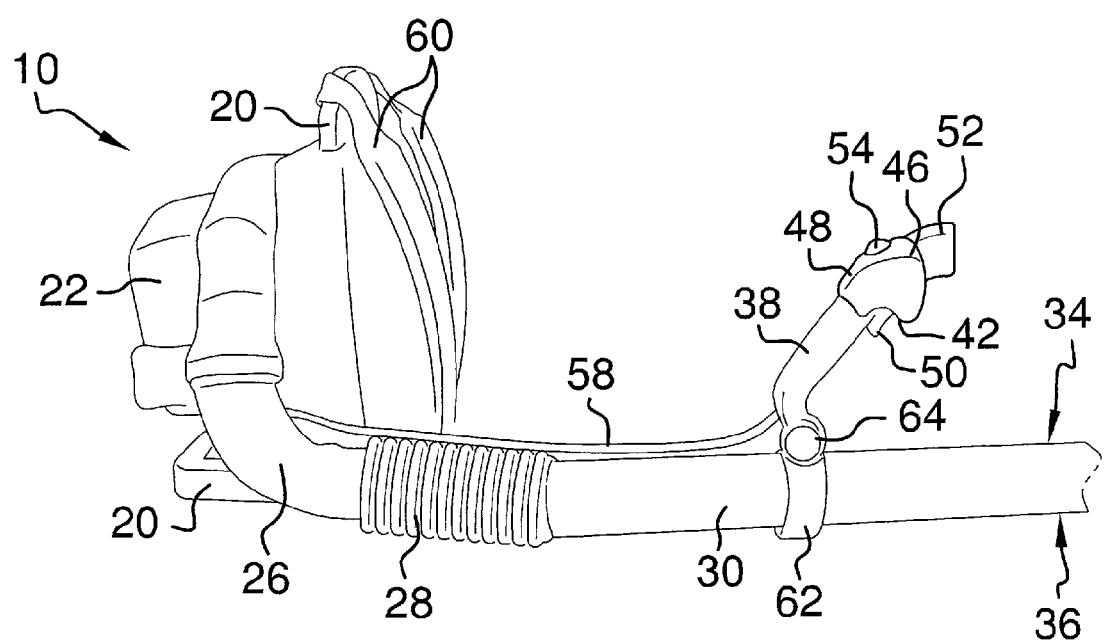
Figure 5:
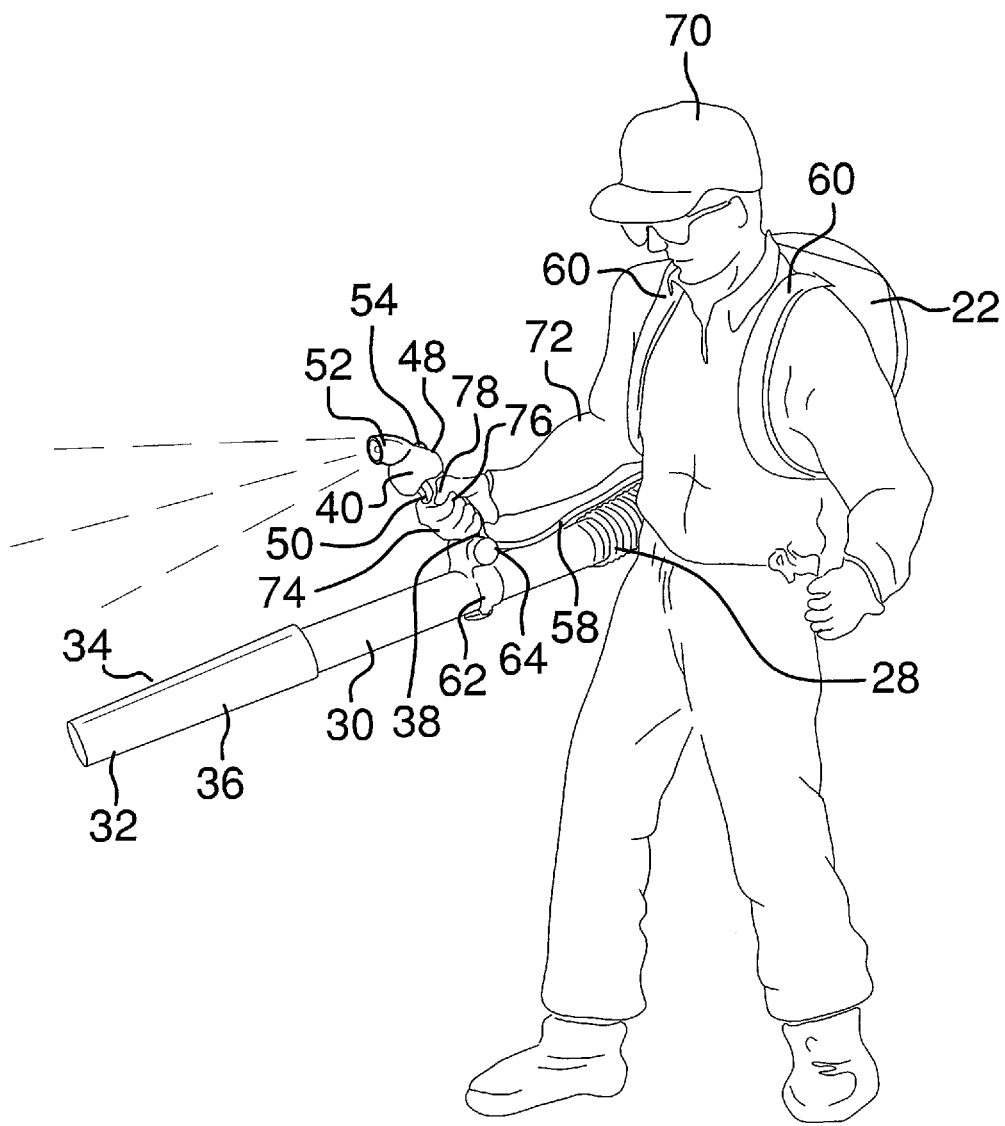

FIG. 1 is a front view.
FIG. 2 is an isometric view.
FIG. 3 is a back isometric view.
FIG. 4 is a side view.
FIG. 5 is an in-use view.

DETAILED DESCRIPTION OF THE DRAWINGS

With reference now to the drawings, and in particular FIGS. 1 through 5 thereof, example of the instant illuminated leaf blower employing the principles and concepts of the present illuminated leaf blower and generally designated by the reference number 10 will be described.

Referring to FIGS. 1 through 5 a preferred embodiment of the present illuminated leaf blower 10 is illustrated.

The illuminated leaf blower 10 includes a frame 20 configured to be carried upon the posterior of a thorax of a person 70, a motor 22 mounted in the frame 20, and a directable blower tube 24 connected to the motor 22. A pair of straps 60 is provided to releasably attach the frame 20 around the thorax of a person 70 wielding the device 10.

The blower tube 24 includes a connector portion 26 disposed from the motor 22, an articulated section 28 flexibly disposed from the connector portion 26, a pipe section 30 disposed from the articulated section 28, the pipe section 30 directable by means of the articulated section 28, and a nozzle portion 32 disposed endwise on the pipe section 30.

A proximal side 34 is disposed along the blower tube 24 length, the proximal side 34 disposed within a plane that underlies a forearm 72 of a person wielding the device 10 (see FIG. 5). A distal side 36 is disposed along the blower tube 24 length, the distal side 36 disposed opposite the proximal side 34. A handle 38 is disposed on the proximal side 34 of the blower tube 24, the handle 38 projecting outwardly at an angle deviant from the perpendicular upon a lockable collar 62.

The lockable collar 62 is a hoop-shaped member disposed around the blower tube 24 pipe section 30. The lockable collar 62 is moveable along the pipe section 30, the lockable collar 62 releasably securable at a desired position along the pipe section 30 to position the handle 38 ergonomically for a particular person 70 wielding the device 10. The handle 38 is joined to the lockable collar 62 by means of an attachment member 64 pivotally securing the handle 30 to the lockable collar 62. The attachment member 64 is pivotally moveable within a sagittal plane relative the handle 38, and the attachment member 64 is lockable to releasably secure the handle 38 at a desired angle relative the pipe section 30, ergonomically suited for use by a particular person 70 wielding the device 10.

A head piece 40 is disposed atop the handle 38. The head piece 40 is configured to overlie the hand 74 of a user grasping the handle 38 and includes an overhanging portion 42, an irregular Quonset-shaped portion 44, a top surface 46, and a rearward haunch 48. A trigger throttle 50 is disposed on the head piece 40, the trigger throttle 50 moveably disposed projecting from the overhanging portion 42. The trigger throttle 50 is configured for ergonomic manipulation with a forefinger 76 of a person 70 wielding the device 10 and alternately increases and decreases the rate of airflow forcibly directed through the blower tube 24, as desired.

A light 52 is disposed atop the head piece 40, the light 52 configured to shine in the same direction the nozzle portion 32 of the blower tube 24 is pointed. A switch 54 in operational communication with the light 52 is disposed upon the rearward haunch 48 of the head piece proximal to the light 52, the switch 54 oriented and configured to be ergonomically operable by means of a thumb 78 of a person 70 wielding the device 10. The light 52 is therefore activated and deactivated by means of the switch 54 to selectively illuminate the area over which the airflow from the illuminated leaf blower 10 is directed.

A battery 56 is disposed on the frame 20 to power the light 52, the battery 56 in circuit with the switch 54 and the light 52. A plurality of wiring 58 interconnects the battery 56, the switch 54, and the light 52. Thusly, the present illuminated leaf blower 10 is self-illuminating, and no additional lighting is needed when using the device 10 in low-light conditions, such as in the early morning or the evening.

What is claimed is:

1. An illuminated leaf blower comprising:
    a frame configured to be carried upon the posterior of a thorax of a person;
    a motor mounted in the frame;
    a directable blower tube connected to the motor;
    a handle disposed on the blower tube;
    a trigger throttle disposed on the handle;
    a light disposed atop the handle, the light disposed to shine in the same direction the blower tube is pointed;
    a switch disposed on the handle proximal to the light;
    a battery disposed on the frame, the battery in circuit with the switch and the light;
    wherein an airflow is forcibly directed through the blower tube, the throttle alternately increases and decreases the rate of airflow therefrom, and the light is activated and deactivated by means of the switch.

2. The illuminated leaf blower of claim 1 wherein the blower tube comprises:
    a connector portion disposed on the motor;
    an articulated section flexibly disposed from the connector portion;
    a pipe section disposed from the articulated section, the pipe section directable by means of the articulated section;
    a nozzle portion disposed endwise on the pipe section;
    a proximal side disposed along the blower tube length, the proximal side disposed in a plane underlying a forearm of a person wielding the device;

a distal side disposed along the blower tube length, the distal side opposite the proximal side;

wherein the blower tube is directible by means of the articulated section flexibly articulating movement of the pipe section between the connector portion and the pipe section, whereby an airflow forcibly directed from the motor through the blower tube is also directable.

3. The illuminated leaf blower of claim 2 wherein the handle is disposed on the proximal side of the pipe section, the handle disposed outwardly at an angle deviant from the perpendicular, the handle configured ergonomically to releasably engage with a hand of a person wielding the device.

4. The illuminated leaf blower of claim 3 wherein the handle further comprises a head piece, the head piece disposed to overlie the hand of a user grasping the handle, the head piece comprising:
an overhanging portion;
an irregular Quonset-shaped portion;
a top surface;
and a rearward haunch.

5. The illuminated leaf blower of claim 4 wherein the trigger throttle is moveably disposed projecting from the head piece overhanging portion, the trigger throttle configured ergonomically for manipulation by a forefinger of a person wielding the device.

6. The illuminated leaf blower of claim 5 wherein the light is disposed on the head piece top surface, the light oriented to shine in the direction the nozzle portion is pointed.

7. The illuminated leaf blower of claim 6 wherein the switch is disposed on the rearward haunch of the head piece, the switch configured to be ergonomically operable by a thumb of a user wielding the device.

8. The illuminated leaf blower of claim 7 wherein the handle further comprises a lockable collar girding the pipe-section, the lockable collar moveable along the pipe section and releasably securable at a desired position along the pipe section.

9. The illuminated leaf blower of claim 8 wherein the handle further comprises an attachment member pivotally securing the handle to the collar, the attachment member pivotally moveable within a sagittal plane relative the handle, the attachment member lockable to secure the handle at a desired angle from the pipe section.

10. The illuminated leaf blower of claim 9 wherein a plurality of wiring interconnects the light to the battery, the plurality of wiring disposed upon the blower tube.

11. The illuminated leaf blower of claim 10 wherein the frame further comprises a pair of straps to releasably secure the frame upon a thorax of a person wielding the device.

12. An illuminated leaf blower comprising:
a frame configured to be carried upon the posterior of a thorax of a person;
a motor mounted in the frame;
a directable blower tube connected to the motor, the blower tube comprising:
a connector portion disposed on the motor;
an articulated section flexibly disposed from the connector portion;
a pipe section disposed from the articulated section, the pipe section directable by means of the articulated section;
a nozzle portion disposed from the pipe section;
a proximal side disposed along the blower tube length, the proximal side disposed in a plane underlying a forearm of a person wielding the device;
a handle disposed on the proximal side of the blower tube, the handle projecting outwardly at an angle deviant from the perpendicular, the handle having a head piece disposed thereon, the headpiece comprising:
an overhanging portion;
an irregular Quonset-shaped portion;
a top surface;
a rearward haunch;
a trigger throttle moveably disposed depending from the overhanging portion;
a light disposed atop the top surface, the light configured to shine in the same direction the nozzle portion is pointed;
a switch disposed on the rearward haunch proximal to the light, the switch oriented and configured ergonomically to be operable by means of a thumb of a user wielding the device;
a battery disposed on the frame, the battery in circuit with the switch and the light;
a plurality of wiring interconnecting the battery, the switch, and the light;
wherein an airflow is forcibly directed through the blower tube by means of the motor, the throttle alternately increases and decreases the rate of airflow therethrough, and the light is activated and deactivated by means of the switch to selectively illuminate an area over which the airflow is directed.

* * * * *